US010318627B2

(12) United States Patent
Doms (10) Patent No.: US 10,318,627 B2
(45) Date of Patent: Jun. 11, 2019

(54) VISUALIZING DEPENDENCIES OF MULTI-DIMENSIONAL DATA

(71) Applicant: SAP SE, Walldorf (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 663 days.

(21) Appl. No.: 14/944,160

(22) Filed: Nov. 17, 2015

(65) Prior Publication Data

US 2017/0139892 A1    May 18, 2017

(51) Int. Cl.
*G06F 17/24*      (2006.01)
*G06T 11/20*      (2006.01)

(52) U.S. Cl.
CPC .......... *G06F 17/246* (2013.01); *G06T 11/206* (2013.01)

(58) Field of Classification Search
CPC . G06F 17/246; G06F 3/04817; G06F 3/04842
See application file for complete search history.

(56) References Cited

U.S. PATENT DOCUMENTS

| | | | | |
|---|---|---|---|---|
| 5,987,481 A * | 11/1999 | Michelman | ........... | G06F 17/246 715/219 |
| 6,460,059 B1 * | 10/2002 | Wisniewski | ........... | G06F 17/246 715/205 |
| 6,496,832 B2 * | 12/2002 | Chi | ........... | G06F 17/246 |
| 7,324,991 B1 * | 1/2008 | Anjur | ........... | G06F 17/30536 |
| 9,465,787 B2 * | 10/2016 | Kjaer | ........... | G06F 17/246 |
| 2006/0080594 A1 * | 4/2006 | Chavoustie | ........... | G06F 17/246 715/218 |
| 2007/0198911 A1 * | 8/2007 | Nilakantan | ........... | G06F 17/246 715/209 |
| 2008/0120355 A1 * | 5/2008 | Alabi | ........... | G06F 17/215 708/270 |
| 2010/0306128 A1 * | 12/2010 | Moffat | ........... | G06Q 40/06 705/36 R |

* cited by examiner

*Primary Examiner* — Scott T Baderman
*Assistant Examiner* — Mario M Velez-Lopez
(74) *Attorney, Agent, or Firm* — Klarquist Sparkman, LLP (57) ABSTRACT

A technology for displaying formula dependencies of multi-dimensional data in a visual representation is provided. In accordance with one aspect, a visual representation of a multi-dimensional data is provided based on metadata of a modeled data set. The metadata includes information of a data model comprising dimensions, hierarchies of dimension members, and formulas for deriving the dimension members. The formula dependencies are determined for members of a dimension based on the metadata. A user selection of a dimension member in the visual representation is received and the framework displays a formula dependency of the selected dimension member on the visual representation using one or more visual markers. The visual markers identify one or more corresponding dimension members from which the selected dimension member is derived and represent a formula used for deriving the selected dimension member.

17 Claims, 6 Drawing Sheets

|   | A | B | C |
|---|---|---|---|
| 1 |   | Measures | Figures |
| 2 |   | W4_Version | Actual |
| 3 |   | W4_Products | Product A | Product B |
| 4 | W4_Account |   |   |
| 5 | + Revenue |   | 20.438 € |   |
| 6 | Dilution |   | - € |
| 7 | Gross Sales |   | 20.438 € |
| 8 | Licensing Revenue |   | - € |
| 9 | - Operating Expenses |   | 17.213 € |
| 10 | Cost of goods sold |   | 7.943 € |
| 11 | Selling, general and administrative expenses |   | 8.172 € |
| 12 | Depreciation and amortization |   | 960 € |
| 13 | Other expenses |   | 138 € |
| 14 | = Operating Income |   | 3.225 € |
| 15 | Non-operating Income |   | 130 € |
| 16 | Earnings before Interest and Taxes (EBIT) |   | 3.355 € |
| 17 | Financial Income |   | 45 € |
| 18 | Income before Interst Expense (IBIE) |   | 3.400 € |
| 19 | Financial Expense |   | 190 € |
| 20 | Earnings before Income taxes (EBT) |   | 3.210 € |
| 21 | Income taxes |   | 1.027 € |
| 22 | Net Income |   | 2.183 € |

| | A | B | C |
|---|---|---|---|
| 1 | | Measures Figures | |
| 2 | 405 | W4_Version Actual | |
| 3 | | W4_Products Product A | Product B |
| 4 | W4_Account | | |
| 5 | + Revenue | 20.438 € | |
| 6 | Dilution | - € | |
| 7 | Gross Sales | 20.438 € | |
| 8 | Licensing Revenue | - € | |
| 9 | - Operating Expenses | 17.213 € | |
| 10 | Cost of goods sold | 7.943 € | |
| 11 | Selling, general and administrative expenses | 8.172 € | |
| 12 | Depreciation and amortization | 960 € | |
| 13 | Other expenses | 138 € | |
| 14 | Operating Income | 3.225 € | |
| 15 | + Non-operating Income | 130 € | |
| 16 | = Earnings before Interest and Taxes (EBIT) | 3.355 € | |
| 17 | Financial Income | 45 € | |
| 18 | Income before Interst Expense (IBIE) | 3.400 € | |
| 19 | Financial Expense | 190 € | |
| 20 | Earnings before income taxes (EBT) | 3.210 € | |
| 21 | Income taxes | 1.027 € | |
| 22 | Net Income | 2.183 € | |

VISUALIZING DEPENDENCIES OF MULTI-DIMENSIONAL DATA

TECHNICAL FIELD

The present disclosure relates generally to a data visualization framework, and more particularly to a framework for visualizing dependencies of multi-dimensional data.

BACKGROUND

In a planning application, an accountant, controller or manager works with a spreadsheet visualization of accounts, Key Performance Indicators (KPIs) and other dimensions of account items. Some accounts in such visualization are derived from other accounts via formulas. These formulas are typically hidden from the user in applications and it is not always easy to trace which account or KPI is derived from which other accounts and with which formula. While accountants are familiar with the formulas for typical KPIs, users of planning application work also with proprietary KPIs that are calculated based on other accounts and KPIs. Since users may define KPIs differently with personalized formulas for example, other users need to understand how these KPIs are calculated.

Therefore, there is a need for an improved data visualization framework that addresses the above-mentioned challenges.

SUMMARY

A technology for displaying formula dependencies of multi-dimensional data in a visual representation is provided. In accordance with one aspect, a visual representation of a multi-dimensional data is provided based on metadata of a modeled data set. The metadata includes information of a data model comprising dimensions, hierarchies of dimension members, and formulas for deriving the dimension members. The formula dependencies are determined for members of a dimension based on the metadata. A user selection of a dimension member in the visual representation is received and the framework displays a formula dependency of the selected dimension member on the visual representation using one or more visual markers. The visual markers identify one or more corresponding dimension members from which the selected dimension member is derived and represent a formula used for deriving the selected dimension member.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework or application for data visualization is described herein. One aspect of the present framework displays formula dependencies of multi-dimensional data in a visual representation. The visual representation, in one implementation, renders multi-dimensional data to enable analysis of information derived from a modeled multi-dimensional data set. Displaying the formula dependencies advantageously allows a user to determine how members of dimensions in the visual representation is derived or calculated. For example, a user may identify how a member of a dimension is derived from other members currently rendered in the visual representation by the display of the formula dependency of that member.

In one implementation, the framework displays the formula dependency using one or more visual markers. The visual markers identify one or more corresponding dimension members from which a selected dimension member is derived and formula associated to the corresponding dimension members. The visual markers, for example, may be displayed in the vicinity or proximate to one or more corresponding members from which the member of interest is derived. The visual markers of the formula dependency are displayed in the same visual representation displaying the set of multi-dimensional data. For example, the formula dependency is presented in the same context of the visual representation without opening additional dialog boxes.

In some implementations, data models may be employed to configure and model the multi-dimensional data. The data models, for example, describe the structure of the data set such as dimensions of the data set, correlation of data elements (or line items) based on the dimensions, members of the dimensions derived from the aggregation of the data elements, and hierarchies between the members. The data models may be used to define the multi-dimensional data with various properties for visualization. The data models may be stored in a database. In one implementation, the metadata of a data model may be used to determine the formula dependencies for visualization at the user device. Using the metadata to determine the formula dependencies advantageously prevents any risk of accidentally modifying the underlying formulas used to calculate the members of the dimensions as the formula dependencies are determined from the metadata.

The formula dependency may be displayed depending on the drill state of the visual representation. For example, only the visual markers associated to the corresponding members which are visible in the visual representation are displayed. Accordingly, the displayed formula dependency matches the drill state of the visual representation and obviates the display of long formulas used in the calculations involving many drill levels to arrive at a particular drill state.

The present framework may be employed, for example, in an analysis application such as a financial planning application. For example, the framework may be integrated in an analysis and visualization system. In some implementations, data elements may be aggregated to derive various measures such as accounts and key performance indicators (KPIs) for products sold in different time periods for example to obtain useful information in financial planning. The framework advantageously enables a user to intuitively identify the formula dependency, for example, of an account of interest by displaying formula dependency based on other accounts from which the selected account is derived. The displayed formula dependency allows for easy understanding of how the accounts and KPI are derived or calculated and is intuitive such that it can be understood by non-experts of the financial planning application. Furthermore, users of the application may easily understand, for example, how proprietary measures such as proprietary KPIs are calculated and derived.

For purposes of illustration, the present framework may be described in the context of formula dependencies of accounts and KPIs in an accounts dimension in a financial planning application. However, it should be understood that the present framework may also be applied to other data analysis and visualization applications.

The framework described herein may be implemented as a method, computer-controlled apparatus, a computer process, a computing system, or as an article of manufacture such as a computer-usable medium. These and various other features will be apparent from the following description.

Figure 1:
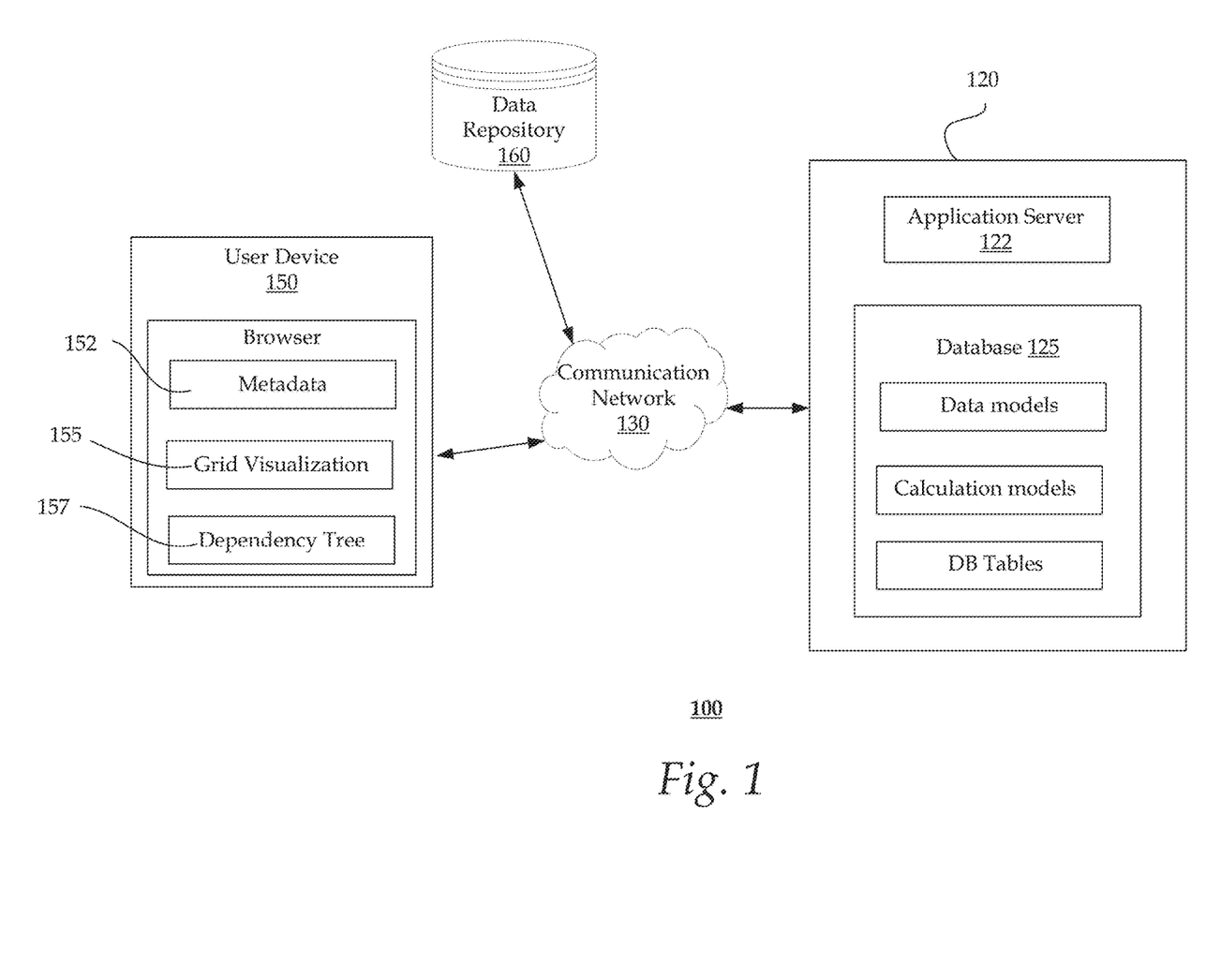
FIG. 1 is a block diagram of an exemplary computing environment.

FIG. 1 shows a block diagram of an exemplary computing environment 100. The environment 100, for example, includes a visualization system 120. The visualization system, for example, is located on a server connected to a communication network 130 and interacts with a user device 150. For example, the visualization system may have a distributed architecture, such as a client-server architecture. Other types of architectures may also be useful.

A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for the user device, it may be any local computing device with, for example, a local memory and a processor. The memory may be volatile or non-volatile types of non-transitory computer-readable media such as magnetic media, optical media, RAM, ROM, removable media, or any other suitable local or remote memory component. The user device may include a personal computer (PC), a tablet PC, a workstation, a network computer or a mobile computing device, such as a laptop, a smart phone device or a tablet. Other types of processing devices may also be used. Illustratively, the environment includes one user device. It is to be understood, however, that the environment may include numerous user devices connected to the communication network. The user devices may be any type or combination of types of user devices. In some implementations, the user device comprises a graphical user interface (GUI). A GUI may provide an efficient and user-friendly manner of presenting information or communicating with the system. Other types of user interfaces may also be useful.

As discussed, the various components of the network are connected through the communication network. For example, components of the network may be connected by internet. Other types of networks or network connections may also be useful. For example, the network connections may include a WIFI or a 3G/4G/LTE connection. In some cases, the network may be a cloud. A user may connect to the server using the user device. The user device may be referred to as the client side while the visualization system may be referred to as the server side. Other types of configurations may also be useful.

The visualization system may be a web-based system. For example, a user may access the system using a web browser on the user device. For example, the web browser may be used to access various applications in the visualization system. In one implementation, a user loads the application via the web browser from the server and the application connects to the server to access data. For example, the application connects to the server to access more data depending on the drill state of the visualization. In other implementations, the visualization system may be an application loaded onto the user device. The application, when initiated, automatically connects to the server.

The visualization system, in one implementation, displays formula dependency in a visual representation of a data set in response to user input. The data, for example, may be a multi-dimensional data. The multi-dimensional data may be obtained from a data repository 160 connected to the network, such as the cloud network. In some implementations, the data repository stores data from various sources such as enterprise resource planning systems, customer relation management systems, relational databases, other types of systems, organizations and entities. The data repository may include data such as database files, operational systems, flat files, set of related records, data from the Internet or other types of data sources. Providing other types of data from various database management systems may also be useful. The data repository may be, for example, any database (e.g., relational database, in-memory database, etc.). Alternatively, the data repository may be integrated in the visualization system. Other configurations for storing and retrieving the multi-dimensional data may also be useful.

The data, for example, may be used in an analysis and planning application and rendered to a user by the visualization system. For example, the data may be used in an SAP Cloud for Planning Application and SAP Cloud for Analytics by SAP SE.

As shown, the visualization system includes an application server 122 and a database 125. Providing other modules for the visualization system may also be useful. The various modules are employed to render the visual representation of multi-dimensional data in accordance with the present framework.

The application server 122 is configured to host applications such as the planning application. The application server receives user input, queries the database to retrieve information for processing and provides a response to the user. The application server includes a set of function modules or programs designed, for example, to generate visual representations of data. The application server, in one implementation, manages retrieval of data from the data repository and stores the data in the database 125 of the visualization system for use by the applications. The application server contains logics for formatting the data for presentation to a user at the user device.

The database 125 may be, for example, any database (e.g., relational database, in-memory database, etc.) or set of related records. The database may be stored in a memory device of the visualization system. The database may connect with other systems, databases and data sources such as the data repository 160 to acquire data to be used by the applications in the visualization system. The data, for example, may be structured data. The database may be organized in any suitable manner such as, for example, data tables or lookup tables. Providing unstructured data may also be useful.

In one implementation, the database contains data models, calculation models and database (DB) tables containing the multi-dimensional data for visualization. Providing other types of data in the database may also be useful.

The data models define the structure of the multi-dimensional data with various properties such as the dimensions, arrangement and correlation of data elements based on the dimensions, dimension members derived from the aggregation of the data elements (e.g., accounts and KPIs of the accounts dimension), hierarchies between the members, formulas used for the calculations to derive members of the dimensions or aggregation of data elements, and so forth. Providing other information in the data models may also be useful. Members of the dimensions may be derived directly from the data elements (or line items). In some implementations, members of a dimension may be derived or calculated based on other members of the dimension. The members of the dimensions may be modeled in hierarchies. Information of the hierarchies and formulas used for calculations in modeling the data set may be used for displaying the formula dependencies in the visual representation. In other words, the modeled information is employed for functionality as well as for visualization. The present framework makes use of the same model information to visualize the formula dependencies in the visual representation.

The data models, for example, models the multi-dimensional data set and aggregates data elements of the data set based on multiple dimensions such as accounts, products, sales year, region, countries, and projects to be presented in a meaningful manner for analysis in the financial planning application. The information of a modeled data set, for example, may be stored in a data table based on the modeled dimensions, attributes and dimension members. The modeled attributes may include, for example ID, Name of the dimension members, parent (e.g., in hierarchies), units, aggregation types, scale (e.g. million), precision for calculated members, formula for deriving the members, and account types (e.g., income/expense). Providing other configurations of the modeled information may also be useful.

Figure 2:
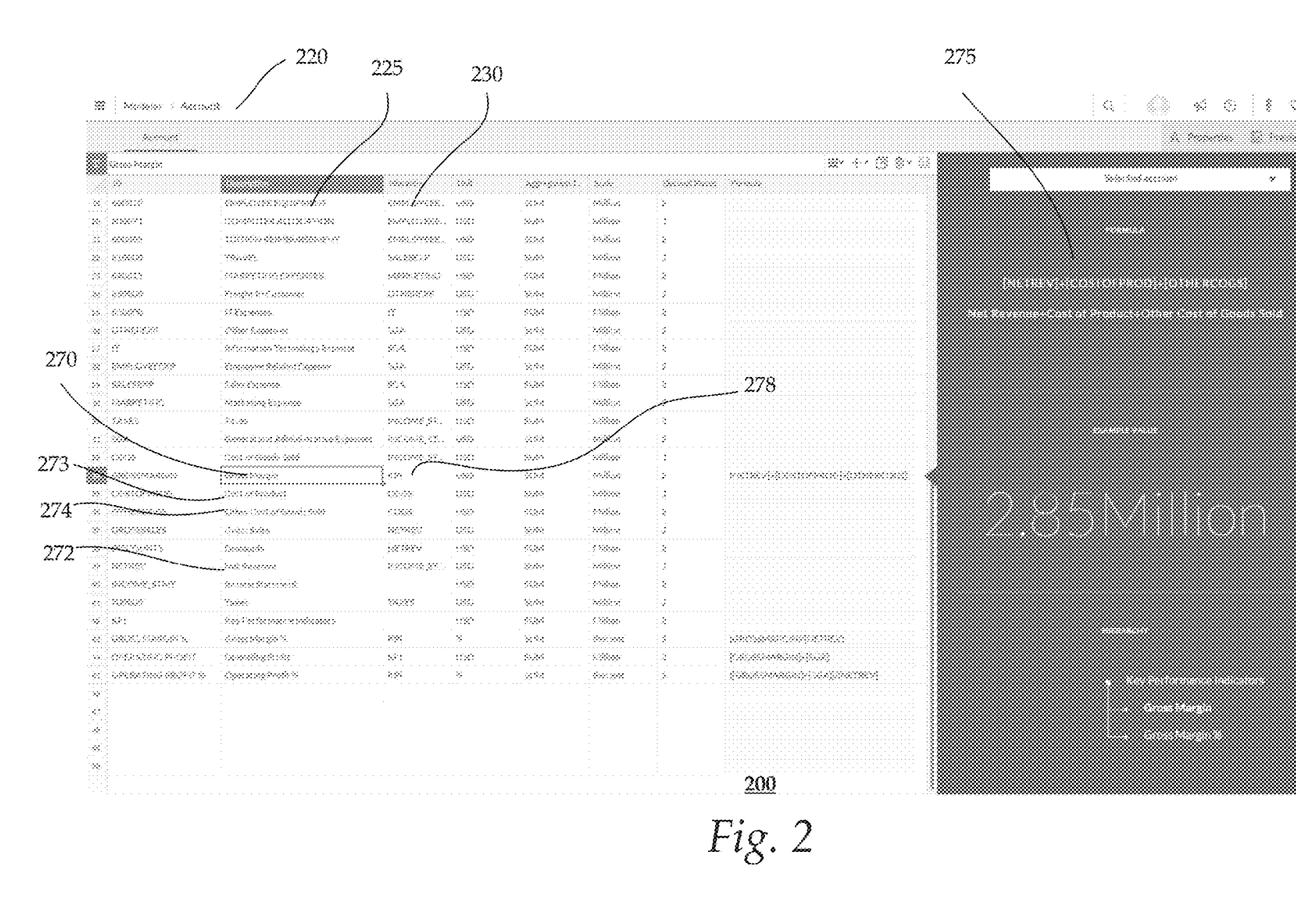
FIG. 2 shows an exemplary screenshot of a portion of a modeled set of data.

FIG. 2 shows an exemplary screenshot 200 of a portion of a modeled set of data. In particular, the screenshot shows exemplary information of the accounts dimension 220 in the modeled data set. As illustrated, the attributes of the modeled members of the accounts dimension may be specified in columns. The dimension members 225 of the accounts dimension may include accounts such as, inter alia, sales expense, marketing expense, costs of goods sold, gross margin, cost of product, net revenue, gross margin %.

In some implementations, the members of the dimension in the data set may be modeled in hierarchies as illustrated in column 230. For example, in the hierarchies, some dimension members may be derived from other members of the dimension, while other dimension members may be derived directly from data elements (or line items of record entries). A line item is, for example, a record of a transaction such a sold good or an expense item. The record entries depend on the dimensions that were modeled. For example, the income statement account is not derived from other members (or accounts), while cost of goods sold and net revenue are derived from income statement in the hierarchy.

Additionally, some dimension members may be calculated from other dimension members. For example, the dimension member gross margin 270 may be calculated from dimension members net revenue 272, cost of product 273 and other cost of goods sold 274. Deriving or calculating the dimension members may be performed using formula 275. For example, the dimension member gross margin may be calculated as a result of a sum of the corresponding dimensions members from which it is based. The dimension member gross margin is at the same time modeled to be a child of dimension member KPI 278. Another dimension member of the accounts dimension, "Gross margin %", may be calculated from the "Gross margin" account. The gross margin account has the unit % instead of USD. Such modeling may be performed based on the calculation models stored in the database. The calculation models contain formulas for performing calculations to produce the aggregated values or figures of members of the modeled dimensions in the data set. Modeling the multi-dimensional data with other attributes and in other configurations may also be useful. Providing other types of data models may also be useful.

The modeled multi-dimensional data are stored in database tables in the database. For example, the data tables may be generated locally by the applications and stored in the database 125. For example, the modeled data set may be organized in one or more tables. The data tables include rows containing entries of data elements or line items and columns specifying the dimensions and attributes of the modeled data. The table structure depends on the number and types of dimensions being modeled. Providing the multi-dimensional data in other formats and arrangement may also be useful. Alternatively, the data tables may be generated and retrieved from other sources such as the data repository. In some implementations, views may be generated to allow for querying the data at different levels of detail.

As described according to one implementation, the visualization system resides on the server. The front end of the system or application resides on the user device. A user accesses the application on the user device to display information using a modeled data set of the data models. In one implementation, the browser retrieves metadata 152 of a data model in response to user input, for example, to view a report. The front end decides which metadata of a data model is fetched from the backend to populate the cells of a grid visualization 155 based on the user input. The retrieved metadata provides configuration information from the data model such as dimensions, members of the dimension, formulas used to calculate the dimension members and attributes of the data set based on the user input. Other types of metadata information may also be useful. The metadata, for example, may be queried and retrieved from the data tables and JSON objects in the database.

The metadata may be used to determine the formulas used to calculate or derive the dimension members. Additionally, the metadata may be used to generate the dependency tree 157 of the dimension members. The dependency tree is a graph structure of the hierarchies of the members of the dimensions. Providing other types of graph structure of the hierarchies may also be useful. The corresponding dimension members from which a dimension member is derived may be identified from the dependency tree. In the present framework, the formula dependencies of the dimension members may be determined based on the hierarchies of the dimension members and formulas used in the calculations. The framework populates a grid visualization with the information of the formula dependencies. For example, the browser populates the grid elements and generates a visual representation of the grid visualization. The web browser displays the formula dependency in the visual representation in response to user selection of a grid element. For example, the web browser displays the formula dependency upon a user hovering over a grid element (e.g., a dimension member). Using the metadata avoids errors such as accidental modification of the underlying formula used.

The browser renders a visual representation of the grid visualization of the modeled data set, for example, according to dimensions and dimension members with aggregated values or figures. For example, the browser may display a portion of the grid visualization in the visual representation depending on the drill state. A user may select a dimension member in the visual representation to determine how it is derived. For example, a member of a dimension may be selected to identify how it is derived from other members which are visible in the visual display. The formula dependency associated to the selected dimension member is then displayed to the user.

In response to the user selection, the visual representation may be refreshed to display the formula dependency of the selected dimension member. The formula dependency, in one implementation, may be presented as visual markers. The visual markers of the formula dependency identify one or more corresponding dimension members from which the selected dimension member is derived and represent the formula used in the calculation of the selected dimension member. The visual markers of the formula dependency may be presented as symbols to represent the operators used in the formula for calculating the selected dimension member. Each of the corresponding dimension members may be associated with a symbol (or visual marker) to denote the operator used to calculate that corresponding dimension member in the formula for deriving the selected dimension member. For example, the symbols may be a plus sign to denote addition of a corresponding dimension member in the operation resulting in the selected dimension member and a minus sign to denote subtraction of another corresponding dimension member. Providing other types of symbols to denote the operators may also be useful. For example, the symbols and operators may include asterisk for multiplication, forward slash for divisions, percentages, rates per unit and so forth.

The visual markers may be displayed proximate to the selected dimension member and each corresponding dimension members from which the selected dimension member is derived. For example, each visual marker may be displayed at positions relative to its associated dimension member. For example, the symbols denoting the operators may be displayed next to the graphical elements representing the selected dimension member and its corresponding dimension members in the visualization. In some implementations, displaying the visual markers may include highlighting, for example, by shading the selected dimension member and its corresponding dimension members in the visual representation to indicate the dependencies.

In some implementations, only the visual markers of the corresponding dimension members which are visible in the visual representation is displayed. In other words, the formula dependency may be displayed depending on the drill level currently displayed for each individual dimension member. For example, for corresponding dimension members which is not visible in the visual representation (e.g., in a collapsed drill state), these corresponding dimension members and their associated visual markers may not be identified and indicated or displayed to the user in the visual representation. Accordingly, depending on the drill state, the visual markers with respect to corresponding dimension members which are not visible in the visual representation may not be displayed. As such, only a subset of the formula dependency is displayed. In other implementations, the user may be presented with an option to display the corresponding dimension members which are not visible in the visual representation in order to view the complete formula dependency of the selected dimension member. For example, other types of graphical icons may be presented to indicate the option to expand a drill state of the visual representation.

It should be appreciated that the different components and sub-components of the visualization system 120 may be located on different machines or systems. It should further be appreciated that the components of the user device 150 may also be located on the visualization system 120, or vice versa.

Figure 3:
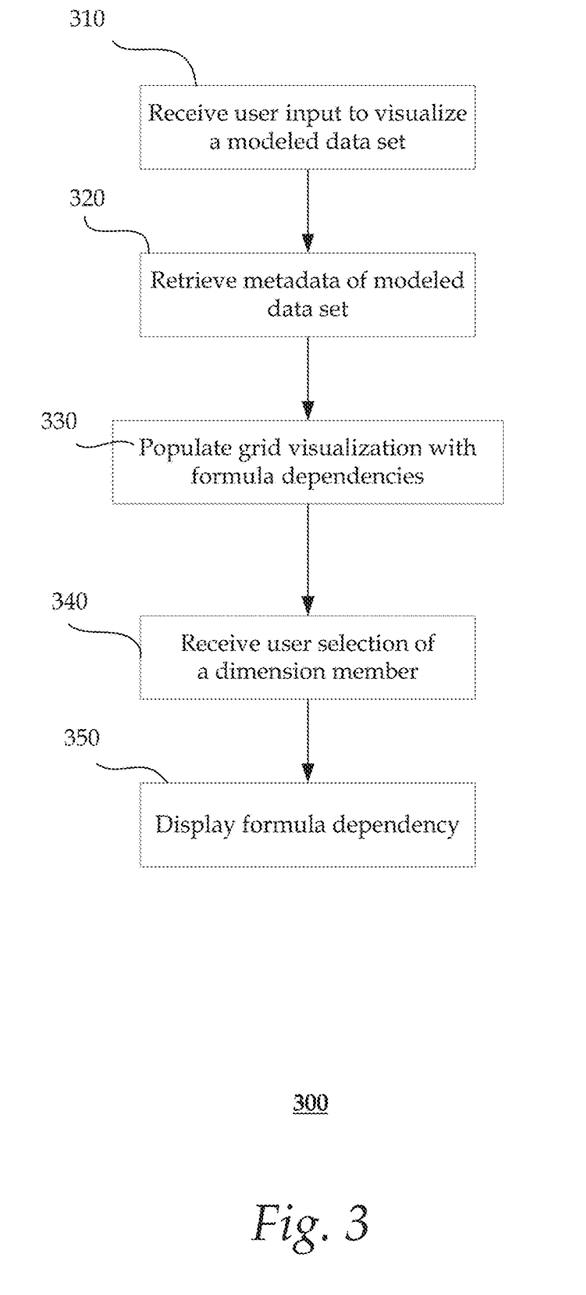
FIG. 3 illustrates an exemplary process for displaying formula dependency of a selected dimension member in a visual representation.

FIG. 3 illustrates an exemplary process 300 for displaying the formula dependency of a selected dimension member in a visual representation. While process flow 300 describes a series of acts that are performed in sequence, it is to be understood that process 300 is not limited by the order of the sequence. For instance, some acts may occur in a different order than that described. In addition, an act may occur concurrently with another act. In some instances, not all acts may be performed.

At 310, the framework receives a user input to visualize a modeled data set. For example, the user input includes a request in the planning application to provide a report of a desired set of data. The request, for example, may include the accounts for a product A for a particular country for the current year. In response to receiving the user input, the framework determines the metadata of a data model to fetch and at 320, retrieves the metadata from the database 125 in the visualization system 120. For example, the framework sends queries to the visualization system 120 to retrieve the metadata. In some implementations, the framework retrieves metadata based on the user input. For example, only the metadata of the accounts for a product A for a particular country for the current year is retrieved from the data model. The metadata may be retrieved, for example, using JavaScript Object Notation (JSON) objects that are transferred via Hypertext Transfer Protocol (HTTP) or Web Sockets.

At 330, the framework populates the grid visualization with formula dependencies of the members of the dimensions. As discussed, the formula dependencies may be determined from the metadata of the underlying data model. The framework determines the formula dependencies based on the hierarchies of the members of the dimensions as well as the formulas used for calculating or deriving the members. The framework then displays a visual representation of the grid visualization.

At 340, the framework receives a user selection of a dimension member. A user selects a dimension member, for example, to view the formula dependency of the selected dimension member. For example, the user may select operating income account to view its formula dependency. The user may select the dimension member, for example, by hovering a mouse over the dimension member in the visual representation. Providing other types of user interactions may also be useful. For example, the user interaction that triggers the visualization may be a touch event on mobile devices.

At 350, the framework displays the formula dependency of the selected dimension member in the same visual representation. For example, the framework displays the formula dependency without opening additional boxes or leaving the context of the visual representation. The formula dependency includes visual markers identifying the selected dimension member and one or more corresponding dimension members from which the selected dimension member is derived. Furthermore, the visual markers represent the formula used in the calculation of the selected dimension member. The visual markers may be symbols representing operators associated to each of the corresponding dimension members which are used in the formula for calculating the selected dimension member. For example, the selected dimension member and each of the corresponding dimension members may be associated with their respective symbol.

Figure 4:
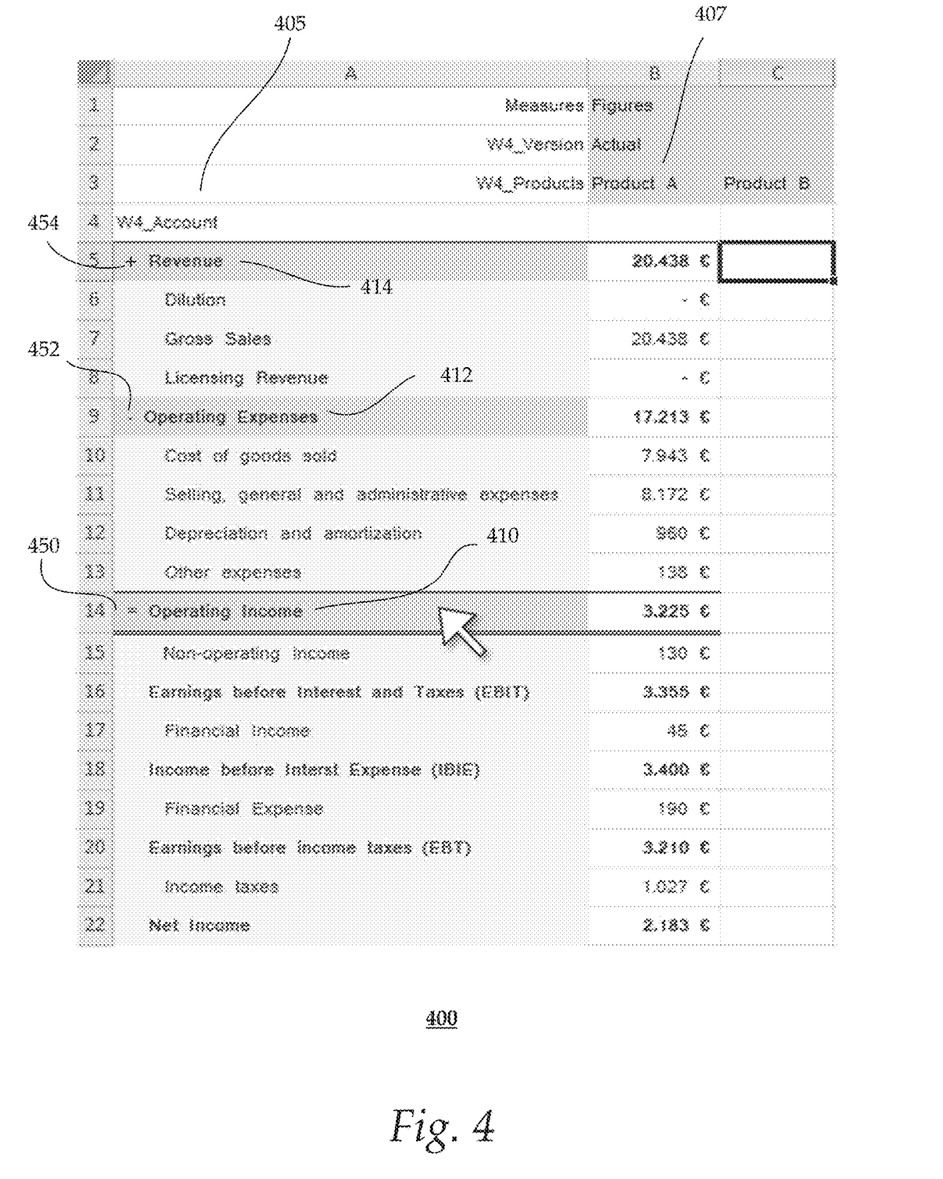
FIG. 4 shows an exemplary screenshot of a visual representation displaying formula dependency of a selected dimension member.

FIG. 4 shows an exemplary screenshot of a visual representation 400 displaying formula dependency of a selected dimension member. In particular, a simplified spreadsheet visual representation is displayed for a particular account in a financial planning application. It should be understood that the spreadsheet is an example of a visual representation of the data set and other types of visual representations such as charts or a combination thereof may be used to visualize the data set. The visual representation shows the planning context the user may be in. As shown, the spreadsheet may be that of accounts of an enterprise for a product A. The user may use the measures of accounts for product A for planning the accounts for product B. The representation may be of a modeled data set for a particular country for the current year (not shown). Alternatively, the user may want to plan for the next quarter or year. The dimensions on the columns B and C of the spreadsheet may be changed within the application depending on the user's needs.

In the visual representation 400, column A illustrates the accounts dimension 405, while column B illustrates product A 407 which is a member of the products dimension. The accounts dimension 405 includes dimension members which are various modeled accounts such as revenue, dilution, gross sales, licensing revenue, operating expenses, cost of goods sold, depreciation and amortization, operating income, non-operating income, income taxes. A dimension member, for instance, provides an aggregated value of line items in the data set modeled based on the dimensions. In some implementations, a dimension member may further be derived from other members in the modeled data set. The exemplary visual representation 400 displays the grid visualization at particular drill state. For example, some accounts may be in a collapsed state and not currently displayed in the visual representation.

In the example, a user selects the operating income 410 dimension member to view its dependencies. For example, the user selects the operating income 410 dimension member to view corresponding dimension members from which it is derived. The browser may be interactive to dynamically display the formula dependency of the selected dimension member. In response to the user selection, the visual representation is refreshed to display the formula dependency.

The formula dependency may be displayed with visual markers. As illustrated, the selected operating income 410 account and its corresponding accounts revenue 412 and operating expenses 414 which are used to derive the operating income are highlighted to indicate the dependencies. The formula dependency, in one implementation, is displayed with symbols 450, 452, and 454 proximate to the selected operating income 410 and its corresponding accounts 412 and 414. For example, the symbols include an equal symbol 450 for the selected operating income 410 to indicate its derivation from other accounts, and plus and minus symbols 452 and 454 for the corresponding accounts from which it is derived. The symbols denote the operators used in the formula for calculating the operating income. Providing other types of symbols for various operators may also be useful.

Figure 5:
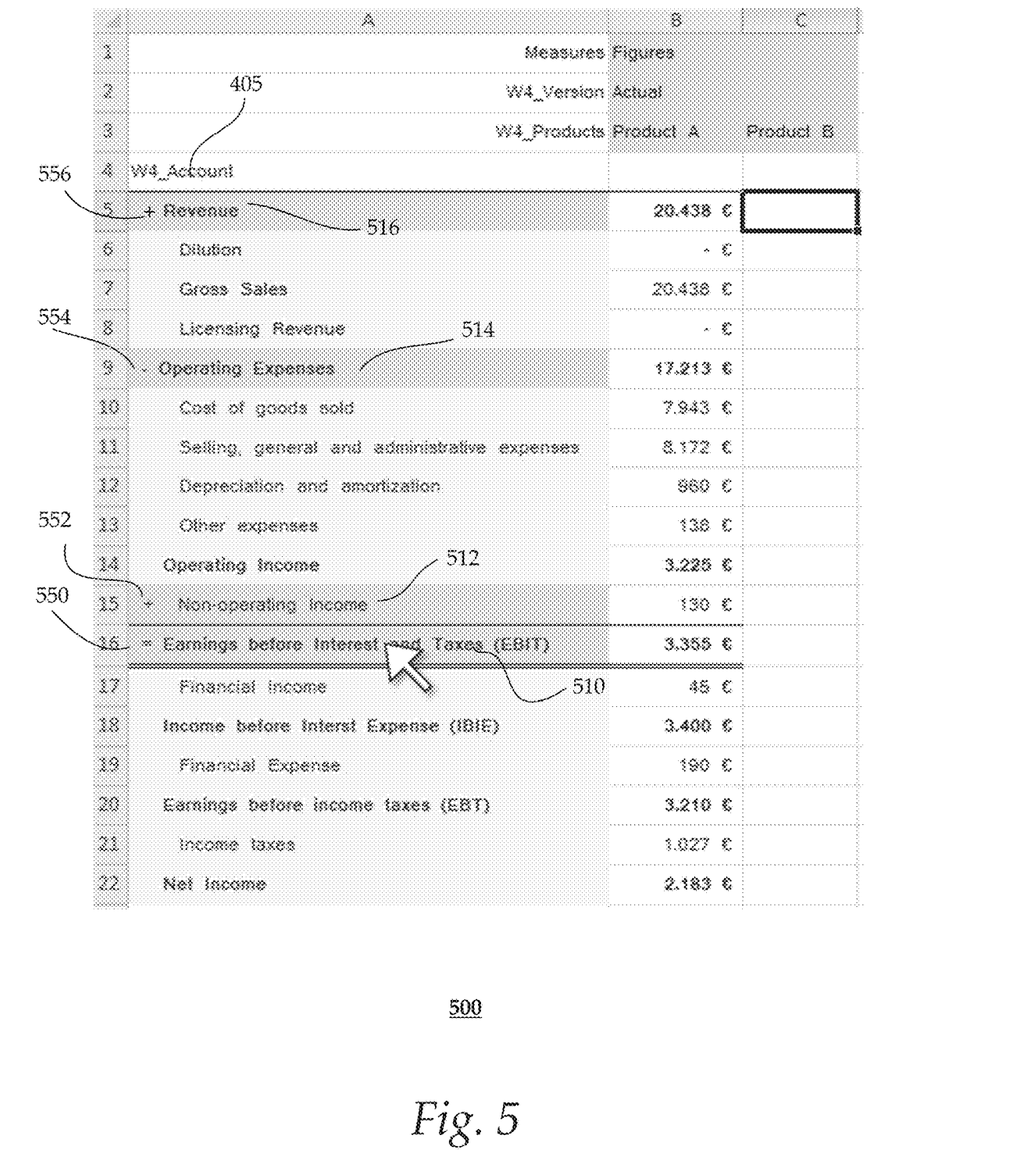
FIG. 5 illustrates another exemplary screenshot of a visual representation displaying a formula dependency in response to a user selecting another member of a dimension.

FIG. 5 illustrates another exemplary screenshot of a visual representation 500 displaying the formula dependency in response to a user selecting another member of the accounts dimension. In the example, the user selects earnings before interest and taxes (EBIT) 510 to view the accounts from which it is derived. As shown, the selected EBIT 510 account and its corresponding accounts 512, 514 and 516 from which the selected EBIT account is derived are highlighted to indicate the relationship of its dependencies. The selected EBIT account 510 is denoted with an equal symbol while the corresponding accounts non-operating income, operating expenses, and revenue 512, 514 and 516 are denoted with plus and minus symbols 552, 554 and 556 to indicate the operators used in the formula for calculating the EBIT account.

In some implementations, the framework displays the formula dependency according to the drill state of the visual representation. For example, only a subset of the visual markers of the formula dependency of a selected dimension member is displayed. For instance, only visual markers associated to corresponding dimension members which are visible in the visual representation are displayed. Visual markers associated to corresponding dimension members in the collapsed state may not be displayed.

Figure 6:
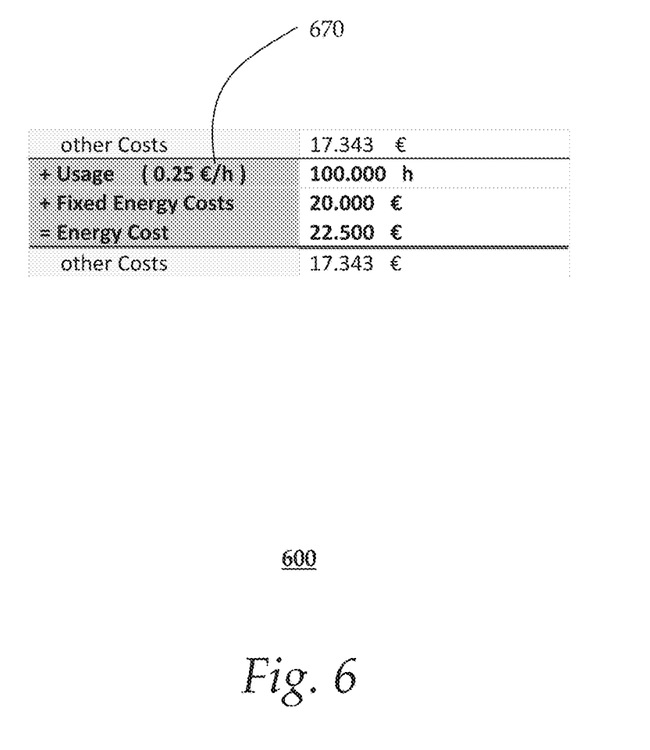
FIG. 6 illustrates yet another exemplary screenshot of a visual representation displaying formula dependency using visual markers.

The hierarchy and order of accounts may be arbitrary in the visual representation. The visualization of formulas is not restricted to any order or hierarchy of accounts in the visual representation. The visual markers of the formulas in the examples are illustrated on the left side of the associated dimension members. However, it should be appreciated that the visual markers may be displayed at any location proximate (or in the vicinity) to the associated dimension members. Furthermore, additional information may also be displayed using the visual markers. For example, a symbol rates per hour 670, as shown in FIG. 6 may be displayed proximate to the dimension member in the visual representation 600. The symbol may be displayed to denote the unit of measure used in the formula for calculating the energy cost based on the usage and fixed energy costs.

As depicted, the displayed visual markers are symbols denoting operators used in the formulas for the calculations. Rather than displaying long formulas which are used to calculate the selected dimension member, the present framework presents the formula dependency with simple visual markers, which advantageously facilitates quick and easy understanding of how members of dimensions in a visual representation are derived. For example, plus and minus symbols enables easy understanding of which dimension members in the visual representation correspond to a selected dimension member and how the selected dimension member is derived from the corresponding dimension members. Furthermore, the formula dependency of the present framework is determined from the metadata of the underlying data model, thus preventing accidental modification of the formulas which are used to calculate the members of the dimensions in the visual representation.

As the formula dependency is displayed on the same visual representation displaying the modeled data set, the user does not need to leave the context of the visual representation. For example, there is no need to open additional dialog boxes to show the dependencies of the data items. This reduces the distraction from having multiple graphical displays. Furthermore, presenting the formula dependency in the same context of the visual representation allows the user to derive insights from where the actual operation is performed.

In some implementations, one or more of the data models may be set or predefined such that the modeled data set are presented in a standardized manner in conformance with certain rules or requirements. For example, financial presentation rules (e.g., multistage single-column income statement which may be regulated by law, company internal rules) may be predefined in the data models. For instance, the data set in the planning application may be modeled such that it adheres to income statement requirements of a country. Accordingly, the report generated by the planning application may be configured to be in line with established presentation rules. The generated report may be viewed in accordance with present framework. For example, the formula dependencies may be displayed to enable a user to determine how the data in the report is derived.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of visualizing dependencies of multi-dimensional data, comprising:
    providing a visual representation of a multi-dimensional data based on metadata of a modeled data set, the metadata includes information of a data model comprising dimensions, hierarchies of dimension members, and formulas for deriving the dimension members, wherein formula dependencies are determined for members of a dimension based on the metadata;
    receiving user selection of a dimension member in the visual representation; and
    displaying a formula dependency of the selected dimension member on the visual representation using one or more visual markers, wherein the visual markers identify one or more corresponding dimension members from which the selected dimension member is derived and represent a formula used for deriving the selected dimension member, and comprise symbols representing operators associated to each of the corresponding dimension members which are used in the formula for deriving the selected dimension member.

2. The method of claim 1 wherein displaying the formula dependency comprises highlighting the selected dimension member and the corresponding dimension members.

3. The method of claim 1 wherein the visual markers comprise a plus symbol, a minus symbol, percentage, rates per unit or a combination thereof.

4. The method of claim 1 wherein the hierarchies of dimension members are determined based on a dependency tree generated from the metadata.

5. The method of claim 1 further comprising populating a grid visualization with the formula dependencies and presenting the visual representation based on the grid visualization.

6. The method of claim 1 wherein the visual markers are displayed proximate to the selected dimension member and each corresponding dimension member.

7. The method of claim 1 wherein displaying the formula dependency of the selected dimension member on the visual representation using the visual markers comprises displaying a subset of the visual markers of the formula dependency.

8. The method of claim 1 wherein the data model comprises an accounts dimension, the dimension members of the accounts dimension comprise accounts and Key Performance Indicators modeled in the data model.

9. A visualization system, comprising:
    a non-transitory memory device for storing computer-readable program code; and
    a processor in communication with the memory device, the processor being operative with the computer-readable program code to:
        provide a visual representation of a multi-dimensional data based on metadata of a modeled data set, the metadata includes information of a data model comprising dimensions, hierarchies of dimension members, and formulas for deriving the dimension members, wherein formula dependencies are determined for members of a dimension based on the metadata,
        receive user selection of a dimension member in the visual representation, and
        display a formula dependency of the selected dimension member on the visual representation using one or more visual markers, wherein the visual markers identify one or more corresponding dimension members from which the selected dimension member is derived and represent a formula used for deriving the selected dimension member and comprise symbols representing operators associated to each of the corresponding dimension members which are used in the formula for deriving the selected dimension member.

10. The system of claim 9 wherein the visual markers are displayed proximate to the selected dimension member and each corresponding dimension member.

11. The system of claim 9 wherein displaying the formula dependency of the selected dimension member on the visual representation using the visual markers comprises displaying a subset of the visual markers of the formula dependency.

12. The system of claim 9 further comprising populating a grid visualization with formula dependencies of members of dimensions in the multi-dimensional data and presenting the visual representation based on the grid visualization.

13. The method of claim 9 wherein displaying the formula dependency comprises highlighting the selected dimension member and the corresponding dimension members.

14. A non-transitory computer readable medium embodying a program of instructions executable by machine to perform steps comprising:
   providing a visual representation of a multi-dimensional data based on metadata of a modeled data set, the metadata includes information of a data model comprising dimensions, hierarchies of dimension members, and formulas for deriving the dimension members, wherein formula dependencies are determined for members of a dimension based on the metadata;
   receiving user selection of a dimension member in the visual representation; and
   displaying a formula dependency of the selected dimension member on the visual representation using one or more visual markers, wherein the visual markers identify one or more corresponding dimension members from which the selected dimension member is derived and represent a formula used for deriving the selected dimension member and comprise symbols representing operators associated to each of the corresponding dimension members which are used in the formula for deriving the selected dimension member.

15. The non-transitory computer readable medium of claim 14 wherein the visual markers are displayed proximate to the selected dimension member and each corresponding dimension member.

16. The non-transitory computer readable medium of claim 14 wherein displaying the formula dependency comprises highlighting the selected dimension member and the corresponding dimension members.

17. The non-transitory computer readable medium of claim 14 wherein the hierarchies of dimension members are determined based on a dependency tree generated from the metadata.

* * * * *